US012722938B2

(12) United States Patent
Noguchi et al.

(10) Patent No.: US 12,722,938 B2
(45) Date of Patent: Sep. 1, 2026

(54) AUTONOMOUS MOBILE ROBOT AND MEDIUM

(71) Applicant: KABUSHIKI KAISHA TOSHIBA, Tokyo (JP)

(72) Inventors: Keiko Noguchi, Kawasaki Kanagawa (JP); Masafumi Matsumura, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1404 days.

(21) Appl. No.: 17/199,229

(22) Filed: Mar. 11, 2021

(65) Prior Publication Data

US 2022/0033216 A1 Feb. 3, 2022

(30) Foreign Application Priority Data

Jul. 28, 2020 (JP) ................................ 2020-127544

(51) Int. Cl.

*B66B 1/34* (2006.01)
*B66B 1/46* (2006.01)
*B66B 5/00* (2006.01)

(52) U.S. Cl.

CPC ............ *B66B 1/3461* (2013.01); *B66B 1/468* (2013.01); *B66B 5/0018* (2013.01); *B66B 2201/103* (2013.01); *B66B 2201/104* (2013.01); *B66B 2201/215* (2013.01); *B66B 2201/4615* (2013.01); *B66B 2201/4638* (2013.01); *B66B 2201/4653* (2013.01)

(58) Field of Classification Search

CPC ...... B66B 1/3461; B66B 1/468; B66B 5/0018
USPC .......................................................... 187/247
See application file for complete search history.

(56) References Cited

U.S. PATENT DOCUMENTS

2012/0041593 A1* 2/2012 Ichinose ............... B66B 1/2458 700/258
2019/0084792 A1 3/2019 Kuroda
2019/0315592 A1* 10/2019 Machida ............... B66B 11/006
2021/0217164 A1* 7/2021 Weese .................... G06N 20/00
2021/0284490 A1* 9/2021 Nichols ................. H04L 67/125
2022/0108245 A1* 4/2022 Torii ................ G06Q 10/06315

FOREIGN PATENT DOCUMENTS

JP 6308341 B1 4/2018
JP 6536746 B2 7/2019

* cited by examiner

*Primary Examiner* — Erick D Glass
(74) *Attorney, Agent, or Firm* — Finnegan, Henderson, Farabow, Garrett & Dunner, LLP

(57) ABSTRACT

According to one embodiment, an autonomous mobile robot includes a communication device, a memory, and a hardware processor connected to the communication device and the memory. The communication device receives list information indicating ride conditions of a car from the elevator control system when transmitting a car call message to an elevator control system on a hall of any floor. The hardware processor includes a ride determination unit and a movement control unit. The ride determination unit determines whether the robot is able to ride in the car or not, based on the list information when the car arrives. The movement control unit allows the robot to ride in the car and move to a destination floor when the robot is able to ride.

12 Claims, 6 Drawing Sheets

| Floors | Getting off schedule | Ride schedule |
|---|---|---|
| 1 | – | |
| 2 | – | |
| 3 | – | |
| 4 | – | R-001 |
| 5 | R-012 | |
| 6 | – | Person |
| 7 | – | R-045 |
| 8 | – | |
| 9 | – | |
| 10 | – | |

FIG. 6

| Floors | Getting off schedule | Ride schedule |
|---|---|---|
| 1 | – | – |
| 2 | – | – |
| 3 | – | – |
| 4 | – | – |
| 5 | R-012 | – |
| 6 | – | Person |
| 7 | – | R-045 |
| 8 | R-001 | – |
| 9 | – | – |
| 10 | – | – |

FIG. 7

AUTONOMOUS MOBILE ROBOT AND MEDIUM

CROSS-REFERENCE TO RELATED APPLICATIONS

This application is based upon and claims the benefit of priority from Japanese Patent Application No. 2020-127544, filed Jul. 28, 2020, the entire contents of which are incorporated herein by reference.

FIELD

Embodiments described herein relate generally to an autonomous mobile robot and a medium.

BACKGROUND

Recently, autonomous mobile robots have used for carriage of baggage and documents in hotels, hospitals, offices, and the like. When a destination is input to an autonomous mobile robot, the autonomous mobile robot moves to the destination while avoiding obstacles and then automatically returns to a home position. By linking the autonomous mobile robot to an elevator, it is possible to move between floors by using an elevator car.

In general, when the autonomous mobile robot is linked to the elevator, the robot is allowed to ride in a predetermined car and carried to a target floor by determination of an elevator control system. However, not only the robot, but general passengers ride in the elevator car. Operations in a case where the robot and human passengers ride together in the car need to be reviewed.

BRIEF DESCRIPTION OF THE DRAWINGS

FIG. 6 is a table showing an example of a scheduled destination list (before riding) according to the first embodiment.

FIG. 7 is a table showing an example of a scheduled destination list after riding (after riding) according to the first embodiment.

DETAILED DESCRIPTION

Figure 1:
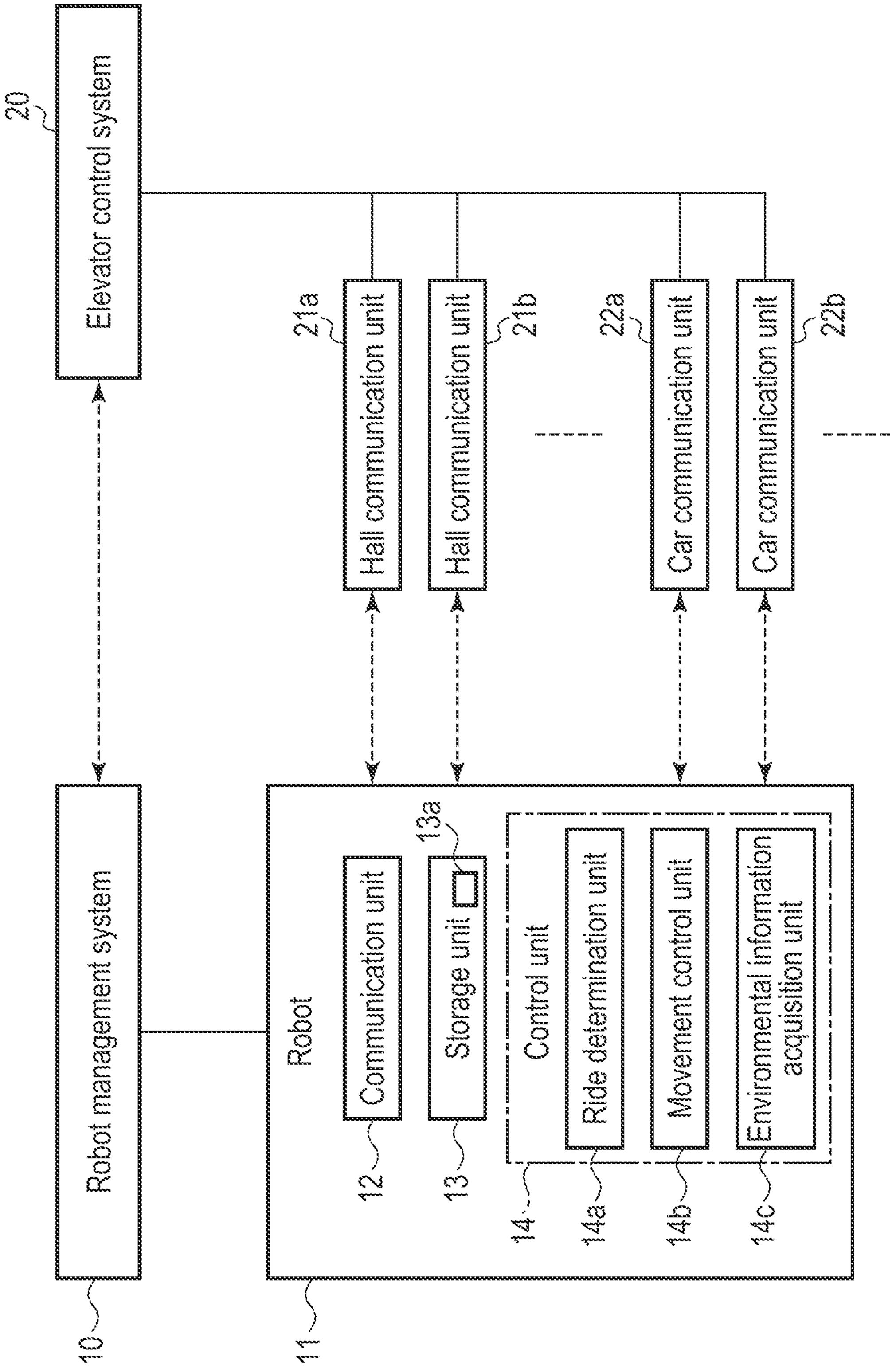
FIG. 1 is a diagram showing a configuration of a link system of a robot and an elevator according to a first embodiment.

In general, according to one embodiment, an autonomous mobile robot capable of riding in a car of an elevator and moving between floors, and includes a communication device, a memory, and a hardware processor connected to the communication device and the memory.

The communication device receives list information indicating ride conditions of the car from the elevator control system when transmitting a car call message to an elevator control system on a hall of any floor. The hardware processor includes a ride determination unit and a movement control unit. The ride determination unit determines whether the robot is able to ride in the car or not, based on the list information when the car arrives. The movement control unit allows the robot to ride in the car and move to a destination floor when the robot is able to ride.

Embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

First Embodiment

FIG. 1 is a diagram showing a configuration of a link system of a robot and an elevator according to a first embodiment. The link system according to the embodiment comprises a robot management system 10 and an elevator control system 20.

The robot management system 10 manages operation of a robot 11. Incidentally, only one robot 11 is illustrated in the example of FIG. 1. In fact, however, a plurality of robots 11 are provided and operation of the robots 11 is managed by the robot management system 10. The robot 11 is, for example, an autonomous mobile robot used for carriage of baggage, documents, and the like, and for cleaning, monitoring, and the like.

The robot 11 comprises a communication unit 12, a storage unit 13, and a control unit 14.

The communication unit 12 makes wireless communications between the robot 11 and the robot management system 10. The robot 11 makes an autonomous movement by receiving an instruction from the robot management system 10 by means of the communication unit 12. In addition, the communication unit 12 is used when the robot 11 makes communications with the elevator control system 20, and also functions as a list acquisition unit for acquiring list information to be described later. Incidentally, the communication between the robot 11 and the elevator control system 20 may be made via hall communication units 21*a*, 21*b*, . . . , car communication units 22*a*, 22*b*, . . . or the robot management system 10.

A robot ID which is identification information inherent to the robot 11 is stored in the storage unit 13. In addition, a program for controlling movement of the robot 11 (hereinafter referred to as a movement control program) 13*a* is stored in the storage unit 13. The control unit 14 controls the autonomous movement of the robot 11 in accordance with a procedure described in the movement control program 13*a*.

The control unit 14 comprises a ride determination unit 14*a*, a movement control unit 14*b*, and an environmental information acquisition unit 14*c* as functions related to the movement control of the robot 11 using the elevator.

When the car arrives at a hall, the ride determination unit 14*a* acquires list information indicating the car ride conditions from elevator control system 20 and determines whether it is possible to ride in the car or not, based on the list information. As described below, the floor on which a passenger is to ride in the car or a currently riding passenger is to ride in the car and the floor on which the passenger is to get off the car are registered the list information (cf. FIG. 6 and FIG. 7). The "passenger" described herein implies not only a human, but also a robot.

The movement control unit 14*b* causes the robot 11 to move to a car arrival position and, when it is possible to ride in the car, executes the movement control of causing the robot 11 to move to the ride position in the car. The environmental information acquisition unit 14*c* acquires environmental information on the periphery of the robot 11. The environmental information includes, for example, an image obtained by capturing a state in the car with a camera.

Figure 2:
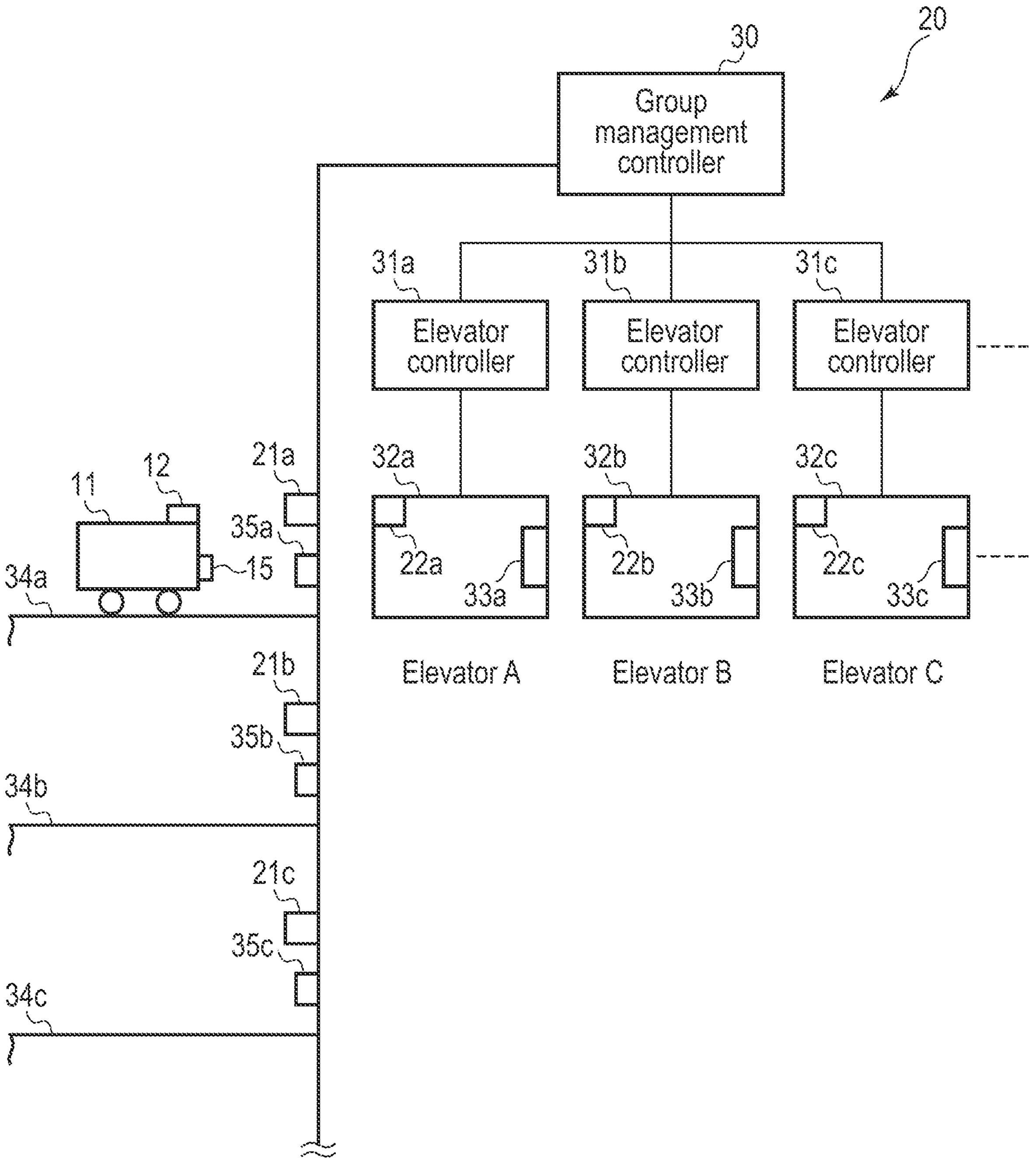
FIG. 2 is a diagram showing a configuration of an elevator control system according to the first embodiment.

As shown in FIG. 2, the elevator control system 20 is composed of a group management controller 30 and elevator controllers 31*a*, 31*b*, 31*c*, . . . . The group management controller 30 serves as a main controller and comprehensively controls operations of a plurality of cars 32*a*, 32*b*, 32*c*, . . . . The elevator controllers 31*a*, 31*b*, 31*c*, . . . execute operation control of the cars 32*a*, 32*b*, 32*c*, . . . of the respective elevators under control of the group management controller 30. More specifically, the elevator controller 31*a* executes control of a motor (traction machine) (not shown) to raise and lower the car 32*a* of elevator A, control of opening and closing the door, and the like. An elevator controller 31*b* and an elevator controller 31*c* execute the same control. The group management controller 30 and the elevator controllers 31*a*, 31*b*, 31*c*, . . . are implemented by computers each comprising CPU, ROM, RAM, and the like.

Car control panels 33*a*, 33*b*, 33*c*, . . . and car communication units 22*a*, 22*b*, 22*c* . . . are provided on the cars 32*a*, 32*b*, 32*c*, . . . . The car control panels 33*a*, 33*b*, 33*c*, . . . include various buttons (destination floor buttons, door open button, door close button, and the like) which the passenger operates inside the car. The cars 32*a*, 32*b*, 32*c*, . . . are assigned car IDs which are identification information inherent to the respective cars.

The car communication units 22*a*, 22*b*, 22*c* . . . are used when the robot 11 inside the car makes wireless communications with the elevator control system 20. In addition, hall control panels 35*a*, 35*b*, 35*c*, . . . and hall communication units 21*a*, 21*b*, 21*c* . . . are provided on the halls 34*a*, 34*b*, 34*c*, . . . of the respective floors. The hall control panels 35*a*, 35*b*, 35*c*, . . . include up and down call buttons as buttons which passengers operate on the halls. The hall communication units 21*a*, 21*b*, 21*c* . . . are used when the robot 11 on the hall makes wireless communications with the elevator control system 20.

The robot 11 is equipped with a sensor 15 for acquiring the ambient environmental information in addition to the communication unit 12 shown in FIG. 1. As the sensor 15, for example, a camera, a laser range finder, an ultrasonic range finder, a laser imaging detection and ranging (LIDAR), or the like can be used. The robot 11 can move to a front side of the car which the robot is to ride while avoiding obstacle by the sensor 15, ride in the car, and move between floors.

Figure 3:
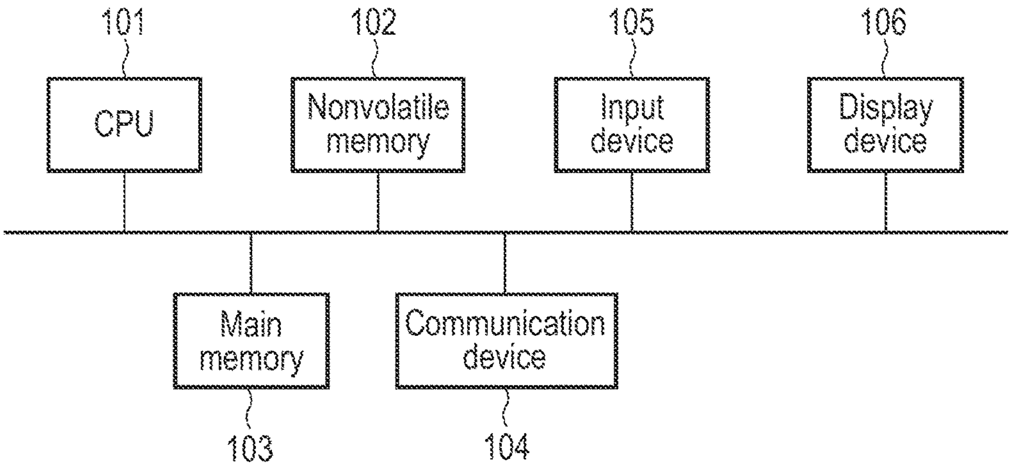
FIG. 3 is a diagram showing an example of a hardware configuration of a computer built in the robot according to the first embodiment.

FIG. 3 is a diagram showing an example of a hardware configuration of the computer built in the robot 11.

A computer is built in the robot 11. The computer comprises a CPU 101, a nonvolatile memory 102, a main memory 103, a communication device 104, an input device 105, a display device 106, and the like. The CPU 101 is a hardware processor configured to control the robot 11. The CPU 101 executes various programs loaded from the nonvolatile memory 102 which is a storage device to the main memory 103. The nonvolatile memory 102 and the main memory 103 correspond to the storage unit 13 shown in FIG. 1.

The programs executed by the CPU 101 include a program (movement control program 13*a*) for executing a processing operation of a flowchart of FIG. 5 described later. Incidentally, the CPU 101 corresponds to the control unit 14 shown in FIG. 1. Several parts or all parts of the ride determination unit 14*a*, the movement control unit 14*b*, and the environmental information acquisition unit 14*c* of the control unit 14 are implemented by causing the CPU 101 (computer) to execute the movement control program 13*a*.

The movement control program 13*a* may be stored in a computer-readable storage medium and distributed or may be downloaded via a network. Incidentally, several parts or all parts of the ride determination unit 14*a*, the movement control unit 14*b*, and the environmental information acquisition unit 14*c* may be implemented by hardware such as integrated circuits (IC) or may be implemented by a combined configuration of software and hardware.

The communication device 104 is a device corresponding to the communication unit 12 shown in FIG. 1 and is configured to execute wireless communication with an external device. The input device 105 is composed of various operation switches, and the like, and is used to execute data input, instructions, and the like. A display device 106 is a device composed of, for example, liquid crystal display or the like to display data, a screen, and the like.

Next, the operations of the system will be described.

Figure 4:
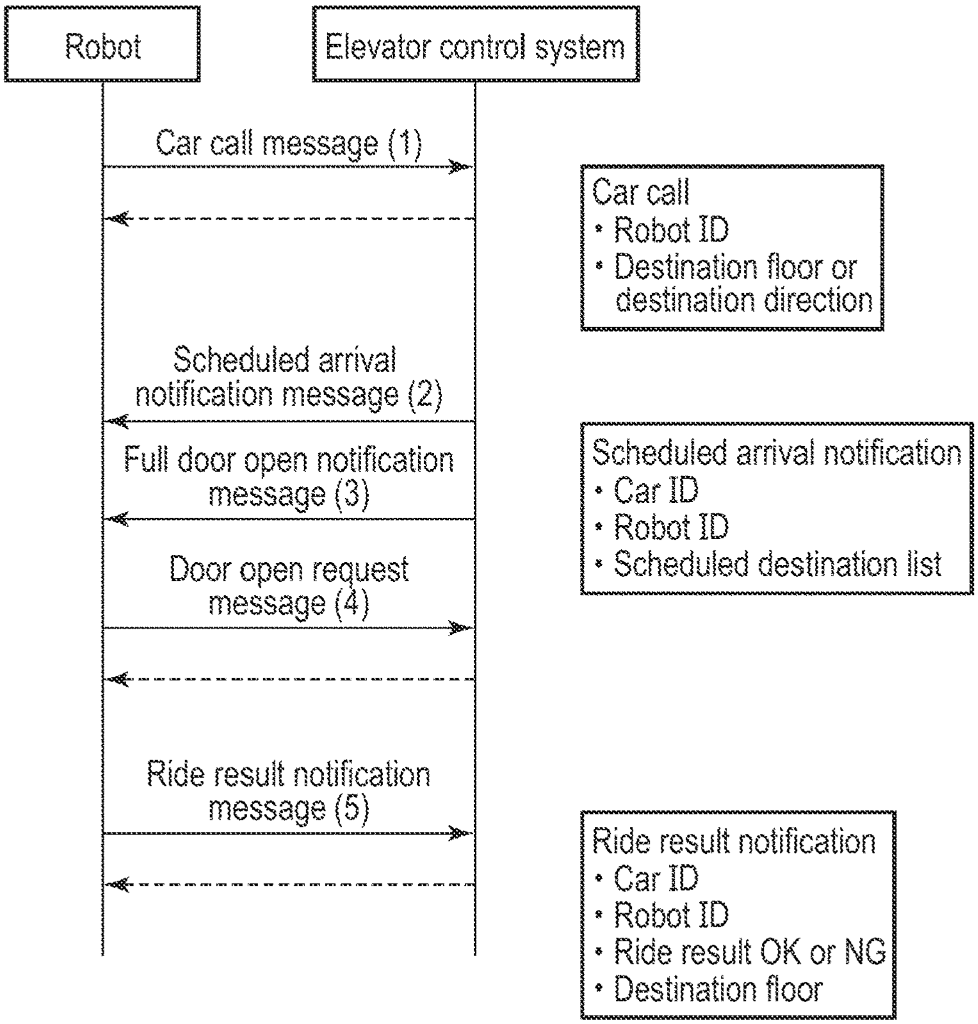
FIG. 4 is a sequence diagram showing a communication procedure of an elevator control system and the robot according to the first embodiment.

FIG. 4 is a sequence diagram showing a communication procedure of the robot 11 ad the elevator control system 20. As described with reference to FIG. 1, the communication between the robot 11 and the elevator control system 20 may be made via the hall communication units 21*a*, 21*b*, . . . , the car communication units 22*a*, 22*b*, . . . or the robot management system 10. In addition, the process on the elevator control system 20 side is mainly executed by the group management controller 30 shown in FIG. 2.

First, a car call message (1) is transmitted from the robot 11 to the elevator control system 20, on a hall of any floor. The "car call message" is a message issued when requesting the car of the elevator. The car call message includes a "robot ID" which is identification information of the robot 11 and information on a "destination floor" or "destination direction (up direction/down direction)" of the robot 11. Incidentally, according to the elevator system, the "car call" is referred to as a "hall call".

When receiving the car call message (1), the elevator control system 20 specifies the robot 11 of the request destination from the robot ID included in the car call message (1) and returns an acknowledgment signal to the robot 11. In addition, the elevator control system 20 selects an optimum car from the cars 32*a*, 32*b*, 32*c*, . . . which are currently in operation, based on the destination floor or the destination direction (up direction/down direction) of the robot 11. The elevator control system 20 allows the selected car serving as an assigned car to move to a standby floor of the robot 11 (i.e., the floor where the robot 11 has made the car call). The information on the standby floor of the robot 11 may be supplied from the robot 11 to the elevator control system 20 or may be supplied from the robot management system 10 to the elevator control system 20.

When the car moves to the standby floor of the robot 11, a scheduled arrival notification message (2) is transmitted from the elevator control system 20 to the robot 11. The scheduled arrival notification message (2) is a message notifying a scheduled arrival of the car, including the "car ID" which is the identification information of the car and the "robot ID" which is the identification information of the robot 11. The scheduled arrival notification message (2) is transmitted to the robot 11 after a "scheduled destination list" managed by the elevator control system 20 is attached to the message. The "scheduled destination list" is list information indicative of the car ride conditions. The floors where the passengers (humans and robot) are scheduled to ride and the floors where the passengers are to get off the car are listed. By transmitting the scheduled destination list to the robot 11 together with the scheduled arrival notification message (2), the robot 11 can preliminarily recognize the ride conditions of the car which the robot itself is to ride when receiving the scheduled arrival notification message (2).

When receiving the scheduled arrival notification message (2), the robot 11 autonomously moves to the arrival position of the car designated by the car ID. When the car arrives at the standby floor of the robot 11 and its door opens, a full door open notification message (3) is transmitted. When receiving the full door open notification message (3), the robot 11 determines riding in the car with the scheduled destination list. The determination of riding will be described below in detail with reference to a flowchart of FIG. 5.

When determining that it is possible to ride in the car, the robot 11 transmits a door open request message (4) to the elevator control system 20 and attempts riding in the car during the transmission. The door open request message (4) is a message for maintaining the door open state, which is the same as a state in which a door open button is pressed. The elevator control system 20 returns acknowledgment indicating that the door open request message (4) has been received to the robot 11 and maintains the car door open state for a certain period.

When the robot 11 rides in the car or when the robot 11 suspends riding in the car, a ride result notification message (5) is transmitted to the elevator control system 20. The ride result notification message (5) includes "car ID", "robot ID", and "ride result (OK or NG)". In addition, when the robot 11 rides in the car, the information on the "destination floor" is transmitted together with the ride result notification message (5). Incidentally, when the information on the "destination floor" is already transmitted to the elevator control system 20 at the transmission of the car call message (1), the information does not need to be transmitted again at the transmission of the ride result notification message (5).

Next, a processing operation of the robot 11 will be described in detail.

Figure 5:
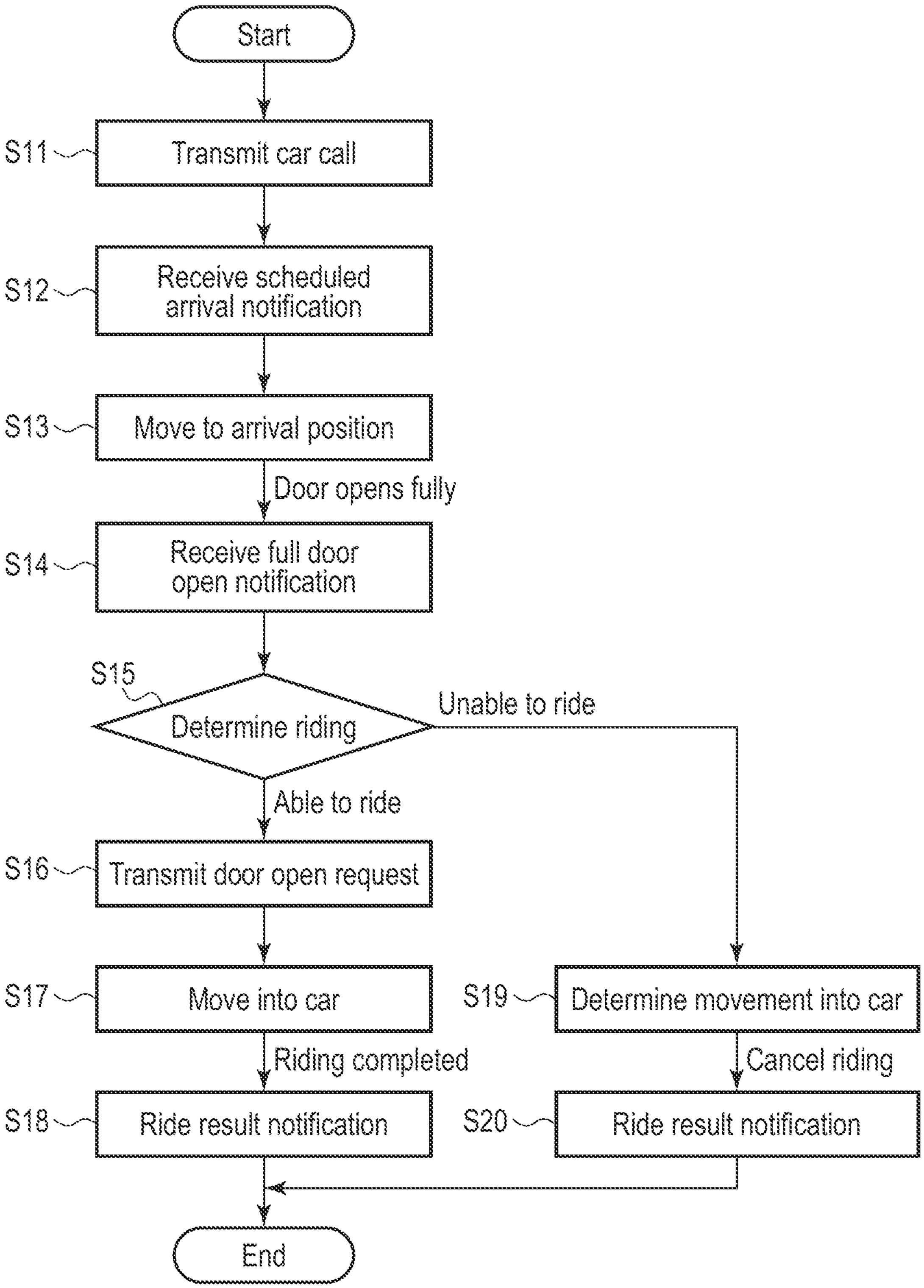
FIG. 5 is a flowchart showing a processing operation of the robot according to the first embodiment.

FIG. 5 is a flowchart showing a process operation of the robot 11. The process indicated by the flowchart is executed by a hardware processor (computer) provided in the robot 11, i.e., the control unit 14 reading the movement control program 13a stored in the storage unit 13.

When the robot 11 arrives at a hall of any floor, the control unit 14 provided in the robot 11 transmits the car call message (1) to the elevator control system 20 via the communication unit 12 (step S11). As described above, the car call message includes the "robot ID", and "destination floor" or "destination direction (up direction/down direction)". Incidentally, the information on the destination floor is stored in advance in, for example, the storage unit 13. When the robot 11 arrives at a hall of any floor, the control unit 14 reads the information on the destination floor from the storage unit 13, includes the information in the car call message (1), and transmits the car call message (1) to the elevator control system 20. At this time, the information on the standby floor of the robot 11 may be supplied from the robot 11 or the robot management system 10 to the elevator control system 20.

When receiving the car call message (1), the elevator control system 20 selects an optimum car from the cars 32*a*, 32*b*, 32*c*, . . . which are currently in operation, as a car to be assigned to the robot 11 and allows the optimum car to move to the standby floor of the robot 11. When the selected car is made to move to the standby floor, the scheduled arrival notification message (2) is transmitted from the elevator control system 20 together with the scheduled destination list.

The control unit 14 receives the scheduled arrival notification message (2) via the communication unit 12 (step S12). The control unit 14 determines car assigned to the robot 11, based on the car ID included in the scheduled arrival notification message (2), and allows the robot 11 to move to the arrival position of the car (step S13). For example, when the car 32*a* of elevator A shown in FIG. 2 is selected as the car for the robot 11, the robot 11 is allows to move to the arrival position of the car 32*a* (i.e., the front of the hall door).

It is assumed below that the car 32*a* of elevator A is selected as the assigned car.

When the door of the car 32*a* fully opens, the full door open notification message (3) is transmitted. When receiving the full door open notification message (3) via the communication unit 12 (step S14), the control unit 14 determines whether to ride in the car 32*a* or not, based on the scheduled destination list acquired from the elevator control system 20 (step S15).

FIG. 6 and FIG. 7 show an example of the scheduled destination list.

FIG. 6 shows the scheduled destination list obtained before the robot 11 rides in the car 32*a*. FIG. 7 shows the scheduled destination list obtained after the robot 11 rides in the car 32*a*. In the figures, "R-001" indicates an ID of the currently focused robot 11. "R-012" and "R-045" indicate IDs of the other robots.

For example, the robot 11 on the fourth floor transmits the car call message. As shown in FIG. 6, "R-001" is registered in a field of ride schedule of the fourth floor in the scheduled destination list. At this time, the robot of "R-012" is riding in the car 32*a* and is to get off the car on the fifth floor. The robot of "R-045" is to ride in the car 32*a* on the seventh floor. Furthermore, a person (referred to as passenger a) is to ride in the car 32*a* on the sixth floor.

If it is assumed here that the car 32*a* arrives at the fourth floor which is the standby floor of the robot 11 and the robot 11 rides in the car 32*a*, the scheduled destination list is updated as shown in FIG. 7. That is, "R-001" is registered in the getting off schedule of the eighth floor which is the destination floor of the robot 11. At this time, since the robot of "R-045" and the passenger a do not ride in the car 32*a*, the robot and the passenger are not reflected on the getting off schedule of the scheduled destination list.

Incidentally, when the passenger is a robot, since the destination floor can be transmitted at the transmission of car call, the getting off schedule can be registered simultaneously with the ride schedule in the scheduled destination list. When the passenger is a person, since the destination floor is undetermined until riding in the car, the getting off schedule cannot be registered simultaneously with the ride schedule in the scheduled destination list. Recently, however, an elevator system comprising a hall destination controller (HDC) capable of directly specifying a destination floor in a hall have been put into practical use. This type of elevator system is called a destination control system (DCS). According to the DCS, since the destination floor can be designated in advance in the hall, the getting off schedule can also be registered simultaneously with the ride schedule in the scheduled destination list.

The control unit 14 determines whether to be able to ride in the car 32*a* or not and further determines the ride position in the car 32*a,* based on the information on the ride schedule and the getting off schedule registered in the scheduled destination list. For example, when it is clarified from the scheduled destination list that a number of passengers are riding in the car 32*a* and that the riding space is short, the control unit 14 determines that riding cannot be executed.

In addition, the control unit 14 compares the floor on which the robot 11 is to get off with the floor on which the other passengers (a person and a robot) are to get off. As a result, for example, when the robot 11 first gets off (and the other passenger gets off later), the control unit 14 determines the position near the doorway of the car 32*a* as the ride position. In contrast, when the passenger gets off the car on the floor earlier than the robot 11 getting off, the control unit 14 determines the back side (rear surface side) of the car 32*a* as the ride position. In the examples shown in FIG. 6 and FIG. 7, since the robot 11 of "R-001" gets off the car earlier than the other passengers, the position near the doorway of the car 32*a* is determined as the ride position.

In addition, the control unit 14 acquires environmental information around the robot 11 via the sensor 15 shown in FIG. 2. The control unit 14 determines whether the robot 11 at the ride position can ride or not, based on the environmental information.

More specifically, for example, when the sensor 15 is a camera, the control unit 14 acquires an image obtained by capturing a state inside the car 32*a* by the camera. The control unit 14 analyzes the captured image and determines whether the other passenger exists at the ride position (i.e., the position near the doorway of the car 32*a* or the back side of the car 32*a*) or not. When the other passenger exists at the ride position, the control unit 14 determines that riding cannot be executed. However, when the other passenger exists at the ride position but the ride space is present, the control unit 14 may determine that riding can be executed since the passenger may move to the other position.

Incidentally, the control unit 14 may find the position where the robot 11 can ride other than the ride position, with the captured image of the camera, and determine the position as a new ride position. Furthermore, the control unit 14 may find the position where riding can be executed, with a sensor other than the camera (for example, an ultrasonic sensor or the like).

When it is determined in step S15 that riding can be executed, the control unit 14 transmits the door open request message (4) to the elevator control system 20 via the communication unit 12 (step S16). Opening the door of the car 32*a* is maintained for a certain period by the transmission of the door open request message (4). During this, the control unit 14 allows the robot 11 to ride in the car 32*a* and move to the ride position (step S17).

When the robot 11 rides in the car 32*a,* the control unit 14 transmits the ride result notification message (5) indicating that the riding is completed to the elevator control system 20 (step S18). The ride result notification message (5) includes "robot ID" of the robot 11 and "car ID" of the car 32*a* in which the robot 11 rides. When the destination floor is not transmitted at the transmission of the car call in step S11, the control unit 14 includes the information on the "destination floor" in the ride result notification message (5) and then transmits the ride result notification message (5) to the elevator control system 20. Thus, the elevator control system 20 can manage the car 32*a* in which the robot 11 rides and the destination floor of the robot 11 by the car ID and the robot ID and can make the car 32*a* operate toward the destination floor of the robot 11.

In contrast, when it is determined in step S15 that riding cannot be executed, the control unit 14 suspends movement into the car 32*a* (step S19) and transmits the ride result notification message (5) indicating that the riding is canceled to the elevator control system 20 (step S20). When receiving the ride result notification message (5) indicating that the riding is canceled, the elevator control system 20 cancels the destination floor of the robot 11 in the operation schedule of the car 32*a*. Therefore, when the robot 11 does not ride, unnecessary operation of the car 32*a* can be prevented.

When riding in the car 32*a* is canceled, the processing flow returns to the process of step S11 and the control unit 14 transmits again the car call message (1) to the elevator control system 20 to await a next car.

Thus, according to the first embodiment, when the robot makes the car call, the robot acquires the list information (scheduled destination list) indicating the car ride conditions from the elevator control system. When the car arrives, the robot itself can autonomously determine riding and the ride position with this list information. The embodiment can thereby flexibly respond to riding together with a person who is not under management of the elevator control system.

In addition, inherent identification information (robot ID and car ID) is attached to each of the robot and the car. For example, when a plurality of cars exist, the robot can autonomously determine the car in which the robot is to ride with the identification information. Therefore, the robot can correctly ride in the car assigned to the robot and smoothly move to the destination floor.

Incidentally, in the first embodiment, the scheduled destination list is included in the scheduled arrival notification message (2) transmitted as the result of response to the car call message (1). However, the scheduled destination list may be included in the full door open notification message (3). That is, when the message which the robot can receive immediately before riding is transmitted while including the scheduled destination list, the robot can use the message for determination of riding.

In addition, the embodiment in which the car call message, the scheduled arrival notification message, the ride result notification message, or the like includes the car ID or the robot ID has been described. However, the embodiment can be implemented without the car ID when only one car exists or can be implemented without the robot ID when only one robot exists.

Second Embodiment

Next, a second embodiment will be described.

Figure 8:
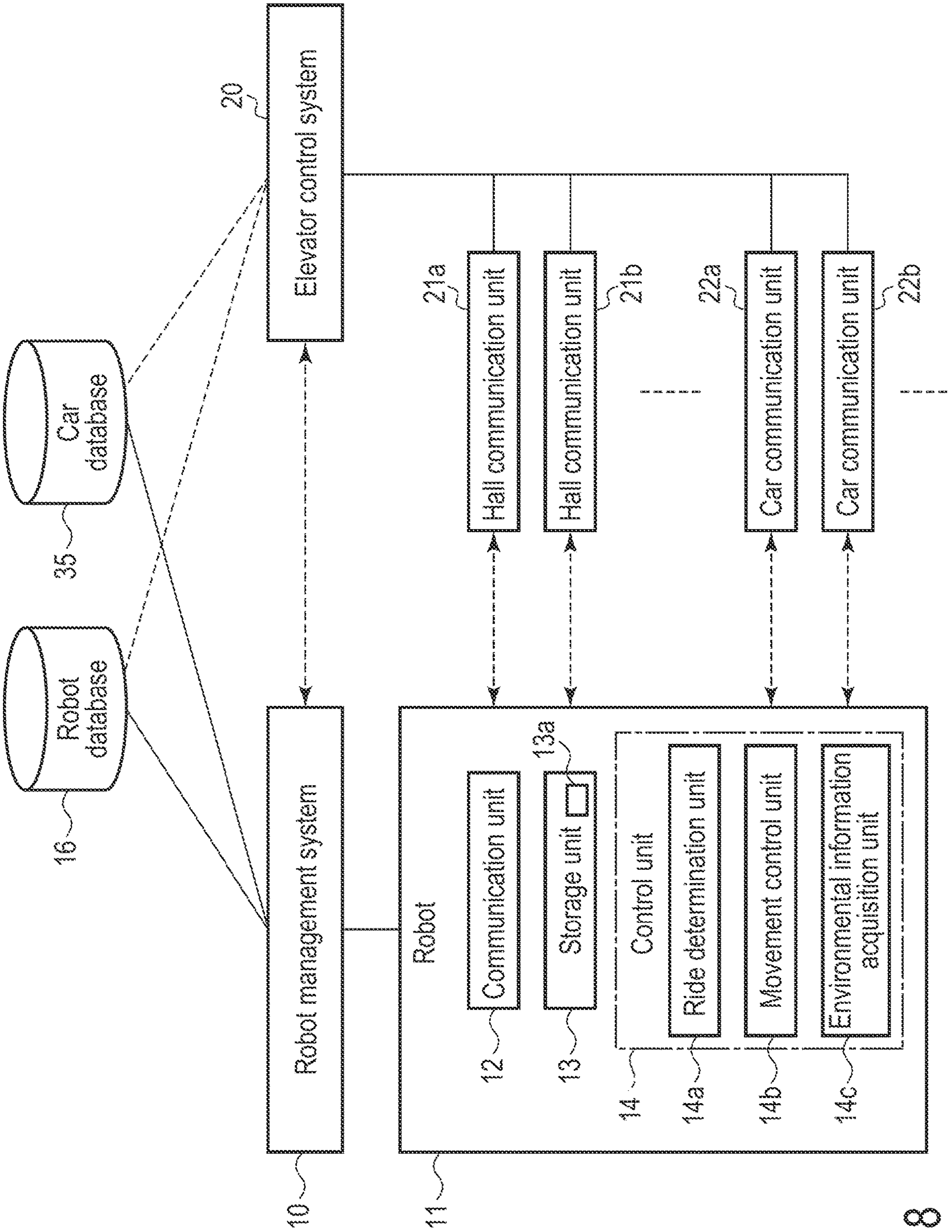
FIG. 8 is a diagram showing a configuration of a link system of a robot and an elevator according to a second embodiment.

FIG. 8 is a diagram showing a configuration of a link system of a robot and an elevator according to a second embodiment. Incidentally, the same elements as those of the configuration of FIG. 1 of the first embodiment are referred to by the same reference numbers and detailed description thereof will be omitted.

The second embodiment comprises a robot database 16 and a car database 35 in addition to the configuration of the first embodiment. Attribute information Ar relating to a plurality of robots is stored in the robot database 16 in association with robot IDs assigned to the robots. The robot attribute information Ar includes, for example, sizes, weights, types, and the like of the robots. Attribute information Ac relating to a plurality of cars is stored in the car database 35 in association with car IDs assigned to the cars. The car attribute information Ac includes, for example, sizes, maximum load weights, types, and the like of the cars.

The robot database 16 and the car database 35 are connected to the robot management system 10 and are referred to when the robot rides in the car and moves. Incidentally, when the elevator control system 20 executes car assignment control in consideration of the robot attribute information Ar and the car attribute information Ac, the robot database 16 and the car database 35 may be connected to the elevator control system 20.

It is assumed below that the robot 11 rides in the car 32*a* shown in FIG. 2 and moves.

The basic sequence is the same as that in FIG. 4. The robot 11 (control unit 14) transmits the car call message (1) including the own car ID and the destination floor (or the destination direction) to the elevator control system 20 and receives the scheduled arrival notification message (2) transmitted as a result of the acknowledgment. At this time, the robot 11 acquires the scheduled destination list of the car 32*a* from the elevator control system 20. When the car 32*a* arrives and the door fully opens, the robot 11 determines riding with the scheduled destination list.

At this time, the robot 11 determines riding in consideration of the attribute information Ac of the car 32*a*. More specifically, the robot 11 accesses the car database 35 via the robot management system 10 and acquires the attribute information Ac of the car 32*a* from the car ID included in the scheduled arrival notification message (2).

The robot 11 determines whether to ride in the car 32*a* or not in consideration of the attribute information Ac. For example, when the other passenger rides in the car 32*a* and it is determined that riding may cause inconvenience to the other passenger in consideration of the size of the car 32*a*, the robot 11 determines that riding cannot be executed. Alternatively, in a case where it is determined that when the robot 11 rides, the load weight of the car 32*a* may exceed the maximum load weight, the robot 11 determines that riding cannot be executed. Furthermore, for example, when the car 32*a* is a specific car that prohibits a robot to ride, the robot 11 determines that riding cannot be executed, irrespective of presence or absence of ride space.

The attribute information Ar of the robot 11 can be acquired by accessing the robot database 16 with the robot ID assigned to the robot 11. For example, when the type of the attribute information Ar is a cleaning robot, an exclusion mode of using the elevator while avoiding ride with a person can be set.

In contrast, the elevator control system 20 can also execute car assignment control in consideration of the robot attribute information Ar and the car attribute information Ac. When receiving the car call message (1), the elevator control system 20 accesses the robot database 16 and acquires the attribute information Ar on the robot 11 from the robot ID included in the car call message (1). Thus, the optimum car can be assigned from the plurality of cars 32*a*, 32*b*, 32*c*, . . . shown in FIG. 2 in consideration of the size, weight, type, and the like of the robot 11. The attribute information Ac on the cars 32*a*, 32*b*, 32*c*, . . . is registered in the car database 35 and can be freely referred to by the elevator control system 20.

Thus, according to the second embodiment, when the robot rides in the car, the robot can acquire the attribute information from the car database. Therefore, the robot can determine riding by considering the size, maximum load weight, type and the like of the car in addition to the list information and can make a more flexible response to riding together with a person. In addition, when the robot rides in the car, the robot can acquire the own attribute information of the robot from the robot database. Therefore, the robot can determine riding by considering the own size, weight, type and the like of the robot in addition to the list information and can make a more flexible response to riding together with a person.

According to at least one of the embodiments described above, the autonomous mobile robot and the program thereof, capable of autonomously determining the ride and moving between floors in accordance with car ride conditions can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An autonomous mobile robot capable of riding in a car of an elevator and moving between floors, the robot comprising:
- a communication device, a memory, and a hardware processor connected to the communication device and the memory,
- the communication device, receiving list information indicating ride conditions of the car from an elevator control system when transmitting a car call message to the elevator control system on a hall of any floor, and
- the hardware processor comprising:
  - a ride determination unit which, when the car arrives, determines whether the robot is able to ride in the car or not, based on the list information, and
  - a movement control unit which, when the robot is able to ride, allows the robot to ride in the car and move to a destination floor,
- the list information including a scheduled destination of a passenger who is to ride in the car or who is riding in the car.

2. The autonomous mobile robot of claim 1, wherein
- the list information is transmitted from the elevator control system together with a scheduled arrival notification message.

3. The autonomous mobile robot of claim 2, wherein
- first identification information inherent to the robot and second identification information inherent to the car are included in the scheduled arrival notification message, and
- when the car arrives, the ride determination unit determines a ride target from a plurality of cars, based on the first identification information and the second identification information.

4. The autonomous mobile robot of claim 1, wherein the ride determination unit determines a ride space in the car, based on the list information, and determines that the robot is able to ride when the ride space exists.

5. The autonomous mobile robot of claim 1, wherein the ride determination unit determines a ride position in the car, based on the list information.

6. The autonomous mobile robot of claim 5, wherein the ride determination unit determines a position near a door of the car as a ride position when a passenger riding in the car gets off later, and determines a back side of the car as a ride position when the passenger riding in the car gets off earlier.

7. The autonomous mobile robot of claim 1, wherein the hardware processor comprises an environmental information acquisition unit which acquires ambient environmental information, and the ride determination unit determines whether the robot is able to ride in the car or not, in consideration of the environmental information.

8. The autonomous mobile robot of claim 7, wherein the environmental information includes an image obtained by capturing a state inside the car with a camera, and the ride determination unit determines whether the robot is able to ride in the car, based on the image of the camera.

9. The autonomous mobile robot of claim 1, wherein when the car arrives and a door fully opens, the list information is transmitted from the elevator control system together with a full door open notification message.

10. The autonomous mobile robot of claim 1, further comprising:

a first database which stores attribute information including at least one of a size, a weight and a type of the robot and identification information inherent to the robot, in association with each other, wherein the ride determination unit determines whether the robot is able to ride in the car, in consideration of attribute information of the robot stored in the first database.

11. The autonomous mobile robot of claim 1, further comprising:

a second database which stores attribute information including at least one of a size, a load weight and a type of the car and identification information inherent to the car, in association with each other, wherein the ride determination unit determines whether the robot is able to ride in the car, in consideration of attribute information of the car stored in the second database.

12. A non-transitory computer-readable medium storing a program executed by a computer controlling an autonomous mobile robot capable of riding in a car of an elevator and moving between floors, the program causing the computer to execute:

receiving list information indicating ride conditions of the car from an elevator control system when transmitting a car call message to an elevator control system on a hall of any floor via a communication device;

determining whether the robot is able to ride in the car or not based on the list information when the car arrives; and allowing the robot to ride in the car and move to a destination floor when the robot is able to ride, the list information including a scheduled destination of a passenger who is to ride in the car or who is riding in the car.

* * * * *